（12）United States Patent
Kennedy

(10) Patent No.: US 11,002,381 B2
(45) Date of Patent: May 11, 2021

(54) FIRE HYDRANT BAFFLE

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

(*) Notice: Subject to any disclaimer, the term of this patent is extended or adjusted under 35 U.S.C. 154(b) by 103 days.

(21) Appl. No.: 16/386,733

(22) Filed: Apr. 17, 2019

(65) Prior Publication Data

US 2020/0332919 A1   Oct. 22, 2020

(51) Int. Cl.
*F16K 47/16* (2006.01)
*E03B 9/04* (2006.01)

(52) U.S. Cl.
CPC ............... *F16K 47/16* (2013.01); *E03B 9/04* (2013.01)

(58) Field of Classification Search
CPC . F16K 47/16; E03B 9/04; E03B 11/06; E03B 9/08; E03B 9/14; F16L 55/04; F16L 55/041; F16L 55/043; F16L 55/045
See application file for complete search history.

(56) References Cited

U.S. PATENT DOCUMENTS

| | | | | |
|---|---|---|---|---|
| 1,021,537 A * | 3/1912 | Webb | ...................... | F16K 15/00 137/107 |
| 2,626,629 A * | 1/1953 | Mueller | ...................... | E03B 9/04 137/283 |
| 3,219,054 A * | 11/1965 | Elder | ........................ | E03B 9/04 137/307 |
| 3,770,000 A * | 11/1973 | Murdock | .................. | E03B 9/14 137/217 |
| 4,177,826 A * | 12/1979 | Luckenbill | ................ | E03B 9/04 137/272 |
| 4,227,544 A * | 10/1980 | Luckenbill | ................ | E03B 9/04 137/307 |
| 9,010,371 B2 * | 4/2015 | Folk | ........................ | F16K 47/08 137/625.33 |
| 9,933,089 B2 * | 4/2018 | Bey | ......................... | F16K 5/12 |
| 10,228,210 B2 * | 3/2019 | Parker | ..................... | F41A 21/30 |
| 2011/0168265 A1 * | 7/2011 | Cheney | .................... | F16K 47/02 137/1 |
| 2015/0267841 A1 * | 9/2015 | Cheney | ................... | F16K 31/53 137/1 |
| 2019/0316707 A1 * | 10/2019 | Helfer | ....................... | F16K 1/22 |

FOREIGN PATENT DOCUMENTS

GB          1017350 A   *   1/1966   .............  F16K 47/16

* cited by examiner

*Primary Examiner* — Jessica Cahill
(74) *Attorney, Agent, or Firm* — Brown & Michaels, PC

(57) ABSTRACT

A baffle for a main valve assembly of a fire hydrant includes an annular body, which further includes a cone-shaped portion, a first ring portion, and a second ring portion. The cone-shaped portion includes a first end with a first outer diameter and a second end with a second outer diameter, the second outer diameter being greater than the first outer diameter, and the cone-shaped portion defining a hollow. The first ring portion is connected to the cone-shaped portion at the first end of the cone-shaped portion, the first ring portion defining a center hole continuous with the hollow. The second ring portion is connected to the cone-shaped portion at the second end of the cone-shaped portion.

18 Claims, 5 Drawing Sheets

FIRE HYDRANT BAFFLE

BACKGROUND OF THE INVENTION

Field of the Invention

The invention pertains to the field of fire hydrants. More particularly, the invention pertains to a baffle of a fire hydrant main valve assembly.

Description of Related Art

A dry-barrel fire hydrant is particularly well suited to colder climates where low temperatures can freeze water in a hydrant and block the flow of water to the hydrant's outlets. In a dry-barrel fire hydrant, an above-ground portion of the hydrant is separated from a pressurized water source by a main valve in a lower barrel or an elbow of the hydrant below ground. The upper barrel remains dry until the main valve is opened by means of a long stem that extends from the main valve, through the upper barrel, to the top, or bonnet, of the hydrant.

FIG. 1 is a partial cross-section of a conventional fire hydrant 1. Referring to FIG. 1, an upper barrel 10, generally made of cast iron, is installed above ground level and is provided with outlet ports 12 for attachment of fire hoses. A barrel cap 14 at the top of the upper barrel 10 houses an operating stem nut 16, which can be turned to open or close the flow of water into the hydrant 1.

The upper barrel 10 is connected to one end of a lower barrel 20 via a coupling element 22, generally of a break-away design such that the upper barrel 10 can separate from the lower barrel 20 cleanly at the coupling element 22, for example, if struck by an automobile. The lower barrel 20 provides a conduit through which water (or another fluid) can flow from a location below the frost line, to the upper barrel 10 where the water is needed for subsequent use in firefighting.

The other end of the lower barrel 20 is similarly connected via a mating flange 24 to a first mating flange 31 of an elbow 30 containing a main valve assembly 40 of the fire hydrant 1. The elbow 30 and the main valve assembly 40 are shown in greater detail in FIG. 2. The elbow 30 can also be connected to a water main via an intervening gate valve (not shown) that can isolate the fire hydrant 1 from the water main during installation, repair, or replacement of the fire hydrant 1. In this embodiment, a second flange 32 of the elbow 30 is provided on one end of the elbow 30 for this purpose.

The operating stem nut 16 in the barrel cap 14 is threaded to a first end 51 of an operating stem 50, which includes an upper stem 52, a lower stem 54, and a breaking stem coupling element 56. The operating stem 50 traverses inside the upper barrel 10 and the lower barrel 20, and is connected to the main valve assembly 40 inside the elbow 30 at a second end 57 opposite the first end 51. Turning the operating stem nut 16 raises and lowers the operating stem 50 and thus the main valve assembly 40, including a main valve seal 41, against or away from a main valve seat 42, which is located in the elbow 30 below the first mating flange 31 of the elbow 30. A valve seat insert 43 is inset in, and sealed against, the elbow 30, above the level of the main valve seal 41, and the main valve seat 42 is set and sealed against the valve seat insert 43, such that when the main valve seal 41 closes and seals against the main valve seat 42, water is sealed in the elbow 30 below the main valve seal 41 and the main valve seat 42. Thus, the elbow 30 has a "wet" side, below the main valve seal 41 and the main valve seat 42, and a "dry" side above the main valve seal 41 and the main valve seat 42.

Drain holes 34 located through the elbow 30 and the main valve seat 42, allow the upper barrel 10 and lower barrel 20 to drain water to surrounding gravel beds or concrete basins when the hydrant main valve seal 41 is closed against the main valve seat 42 after use. Hence, the term "dry barrel" hydrant is applied, as no water remains present in the hydrant's upper barrel 10 and lower barrel 20 when the main valve seal 41 in the elbow 32 is closed against the main valve seat 42.

The main valve seal 41 is disposed between a main valve bottom plate 44 below the main valve seal 41, and a drain valve body 45 above the main valve seal 41. The lower stem 54 passes through the drain valve body 45, and the main valve seal 41, and is threaded into the main valve bottom plate 44. Once assembled, a drain valve pin 46 inserted through the drain valve body 45 and the lower stem 54 prevents rotation of the lower stem 54 relative to the main valve bottom plate 44 during operation.

The drain holes 34 are open to the inner volume of water above the main valve seal 41 when the main valve seal 41 is closed against the main valve seat 42, and the upper barrel 10 and lower barrel 20 are allowed to drain (see arrows). The drain valve body 45 is also provided with a drain valve facing 47, and a rubber boss 48, which biases the drain valve facing 47 to move outwardly toward the main valve seat 42. When the main valve seal 41 is opened by downward movement of the lower stem 54, the drain valve body 45 also moves downwardly such that the drain valve facing 47 is moved over the drain holes 34 in the elbow 30. The drain valve facing 47 is then held against the drain holes 34 by bias of the rubber boss 48 and high pressure water flowing past the main valve seal 41, effectively blocking the flow of water out of the drain holes 34 in the elbow 30.

When the operating stem nut 16 is turned to raise the operating stem 50, and to close the main valve assembly 40 against the main valve seat 42, as the main valve seal 41 approaches the main valve seat 42, the decreased pressure caused by water rushing between the main valve seat 42 and the main valve seal 41 pulls and/or stretches the main valve seal 41 toward the main valve seat 42, causing the main valve seal 41 to cavitate, flutter, or oscillate rapidly against and apart from the main valve seat 42. This cavitation or oscillating movement of the main valve seal 41 interrupts the steady flow of water (or other fluid) past the main valve assembly 40 into the lower barrel 20, causing turbulence and vibration, which in turn can be disruptive to a fire hydrant operator, and can cause extra wear on fire hydrant components.

FIG. 3 shows an alternative prior art elbow 60 and main valve assembly 70. In this embodiment, a main valve seat 62 is integral with the elbow 60, and no valve seat insert is necessary. A main valve seal 72 closes against the main valve seat 62. An elbow drain hole 64 is equipped with a drain hole bushing 80 and a hollow drain hole stem 82, which can be adjusted within the drain hole 64 to seal against a drain valve facing 74 of a drain valve body 76 when the main valve assembly 70 is in an open position to allow fluid to flow through the elbow 60 into a lower barrel 90. FIG. 3 shows the main valve assembly 70 in a closed position, with the elbow drain hole 64, the drain hole bushing 80, and the drain hole stem 82 aligned with a drain body drain hole 78, enabling fluid to flow from the lower barrel 90 through the drain body drain hole 78 and the elbow drain hole 64.

Here again, when the main valve seal 72 is closing toward the main valve seat 62, as the main valve seal 72 approaches the main valve seat 62, the decreased pressure caused by water rushing between the main valve seat 62 and the main valve seal 72 stretches the main valve seal 72 toward the main valve seat 62, causing the main valve seal 72 to cavitate or oscillate rapidly against and apart from the main valve seat 62. This oscillating stretching of the main valve seal 72 to hit the main valve seat 62 interrupts the steady flow of fluid past the main valve assembly 70 into the lower barrel 90, causing turbulence and vibration, which in turn can be disruptive to a fire hydrant operator, and can cause extra wear on fire hydrant components.

SUMMARY OF THE INVENTION

A baffle for a main valve assembly of a fire hydrant is configured to slow the flow of water between a main valve seal and a main valve seat when the main valve seal is close enough to the main valve seat to cause cavitation of the main valve seal. The baffle reduces the flow rate sufficiently such that cavitation is avoided.

In an embodiment, a baffle for a main valve assembly of a fire hydrant includes an annular body, which further includes a cone-shaped portion, a first ring portion, and a second ring portion. The cone-shaped portion includes a first end with a first outer diameter and a second end with a second outer diameter, the second outer diameter being greater than the first outer diameter, and the cone-shaped portion defining a hollow. The first ring portion is connected to the cone-shaped portion at the first end of the cone-shaped portion, the first ring portion defining a center hole continuous with the hollow. The second ring portion is connected to the cone-shaped portion at the second end of the cone-shaped portion.

In another embodiment, a main valve assembly of a fire hydrant includes: a baffle including an attachment portion and a baffling portion; a main valve seal adjacent the baffle at the baffling portion; an operating stem passing through the baffle into the main valve seal; and an attachment element engaging the attachment portion of the baffle to secure the baffle in position with respect to the main valve seal.

In another embodiment, a fire hydrant includes: an elbow including an inner circumference and a main valve seat around the inner circumference, the main valve seat having an inner circumference and an innermost diameter; and a main valve assembly in the elbow, the main valve assembly including a main valve seal and a baffle adjacent the main valve seal, the main valve seal being configured to abut and seal against the inner circumference of the main valve seat, the baffle having an outer diameter, the outer diameter of the baffle being less than the innermost diameter of the main valve seat.

DETAILED DESCRIPTION OF THE INVENTION

Figure 1:
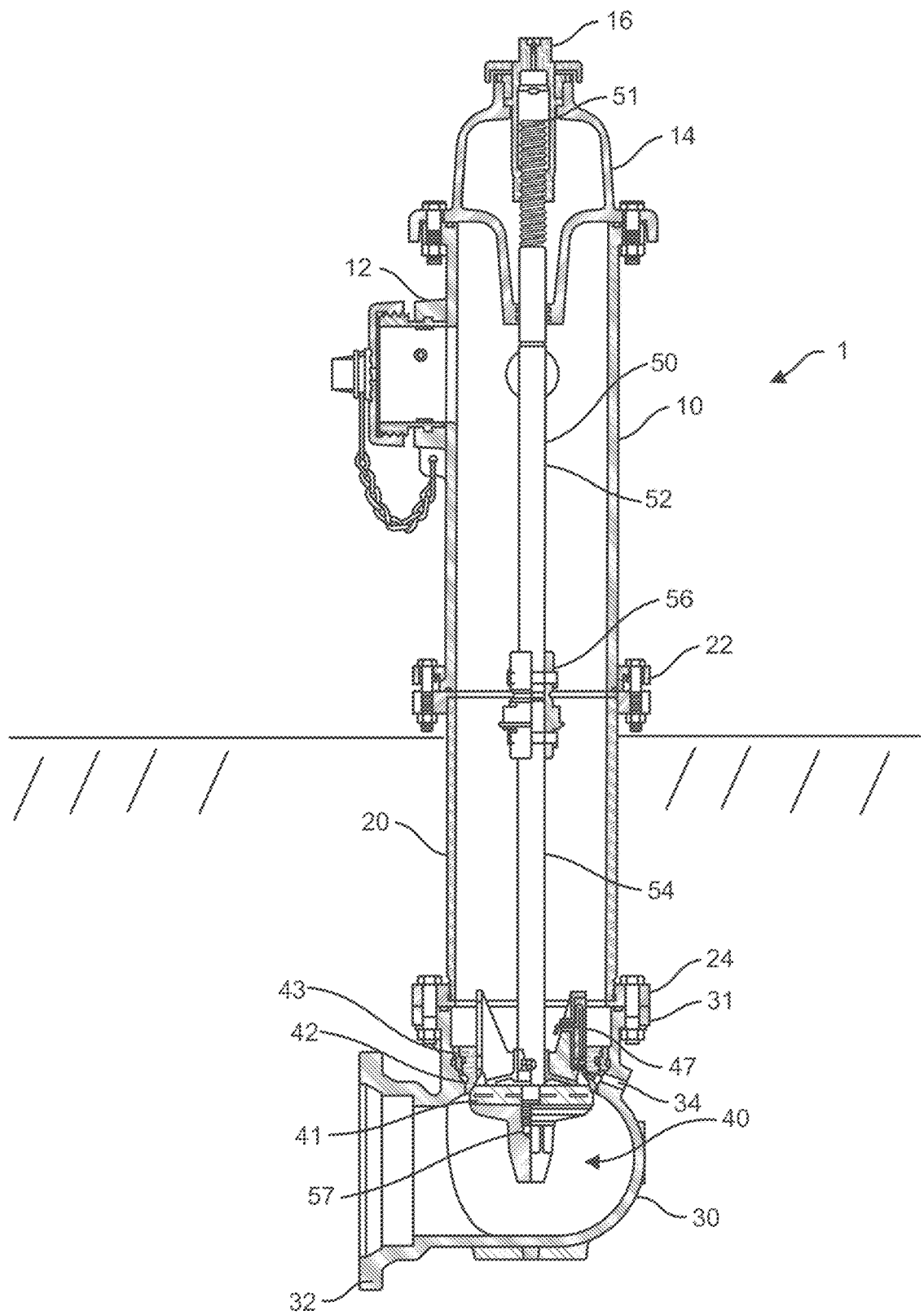
FIG. 1 shows a partial cross-section of a conventional fire hydrant.
Figure 2:
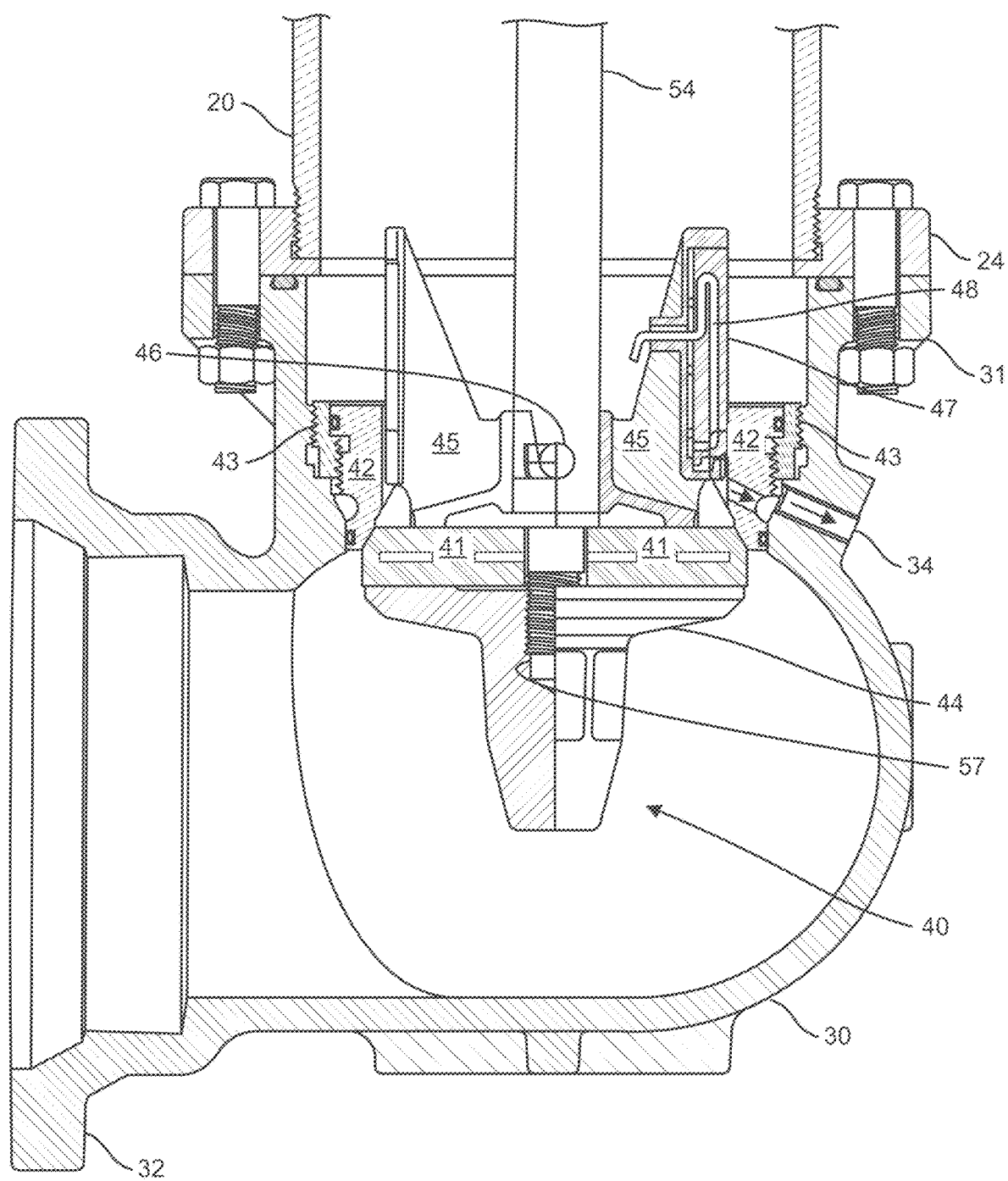
FIG. 2 shows a detailed view of an elbow and main valve assembly of the fire hydrant of FIG. 1.
Figure 3:
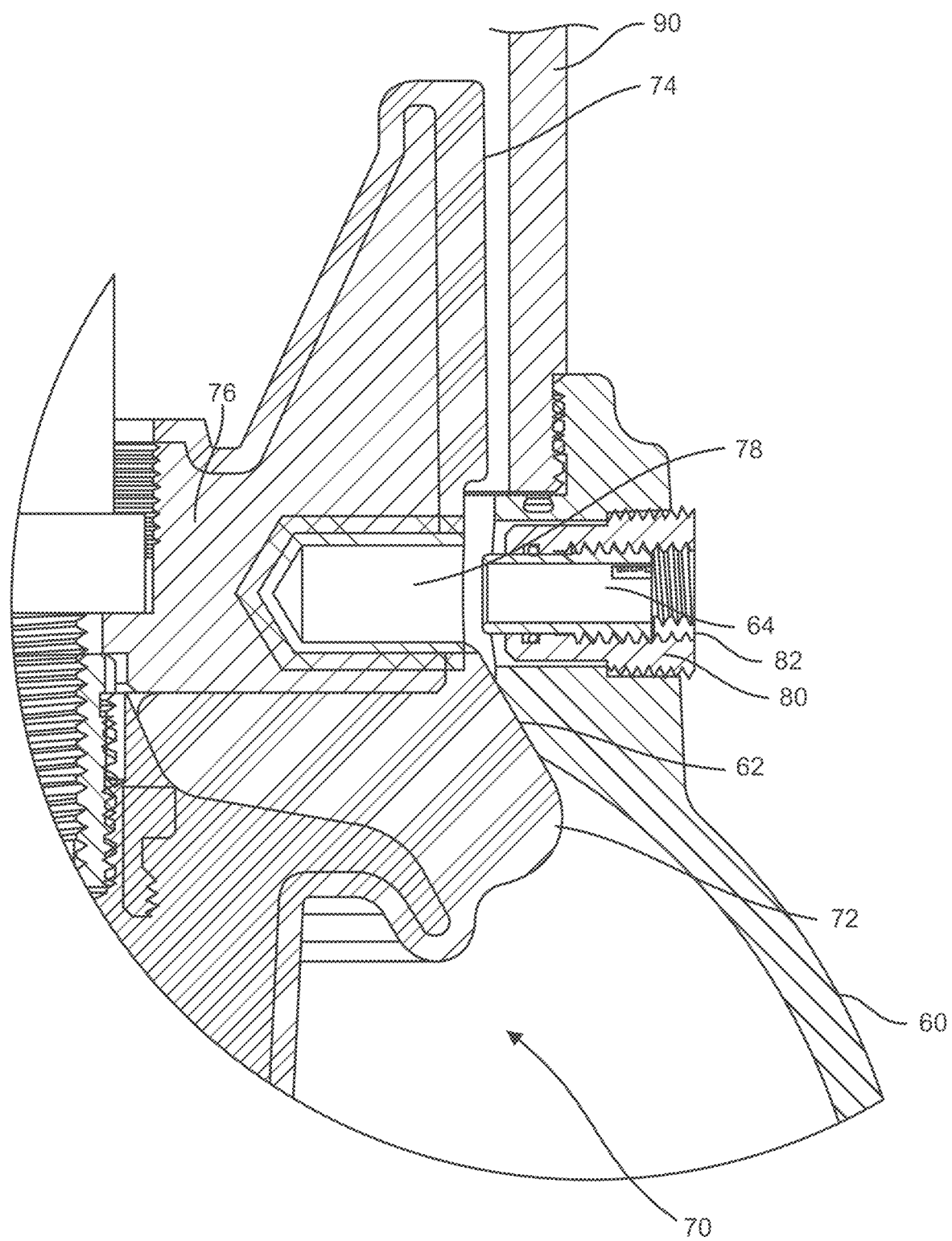
FIG. 3 shows a cross-section of a prior art elbow and main valve assembly, according to another embodiment.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "axial" and/or "axially" refer to the relative position/direction of objects along an axis substantially parallel with a center axis of the fire hydrant or other component specified (e.g. a baffle for a main valve assembly of a fire hydrant). As further used herein, the terms "radial"

and/or "radially" refer to the relative position/direction of objects along an axis substantially perpendicular with the center axis. Additionally, the terms "circumferential" and/or "circumferentially" refer to the relative position/direction of objects along a circumference surrounding the center axis.

The term "elastic deformation" is understood to be a reversible change in the dimensions of a material, in which the material has a first set of dimensions when no forces are applied to it, the material transitions to a second set of dimensions when forces are applied to it, and the material transitions back to its original set of dimensions when the forces are no longer applied. Such deformation includes but is not limited to changes in spatial dimensions and combinations thereof (e.g., changes in volume, cross-sectional profile, and diameter), and can result from forces including, but not limited to, forces of compression and/or stretching under tension.

Figure 4:
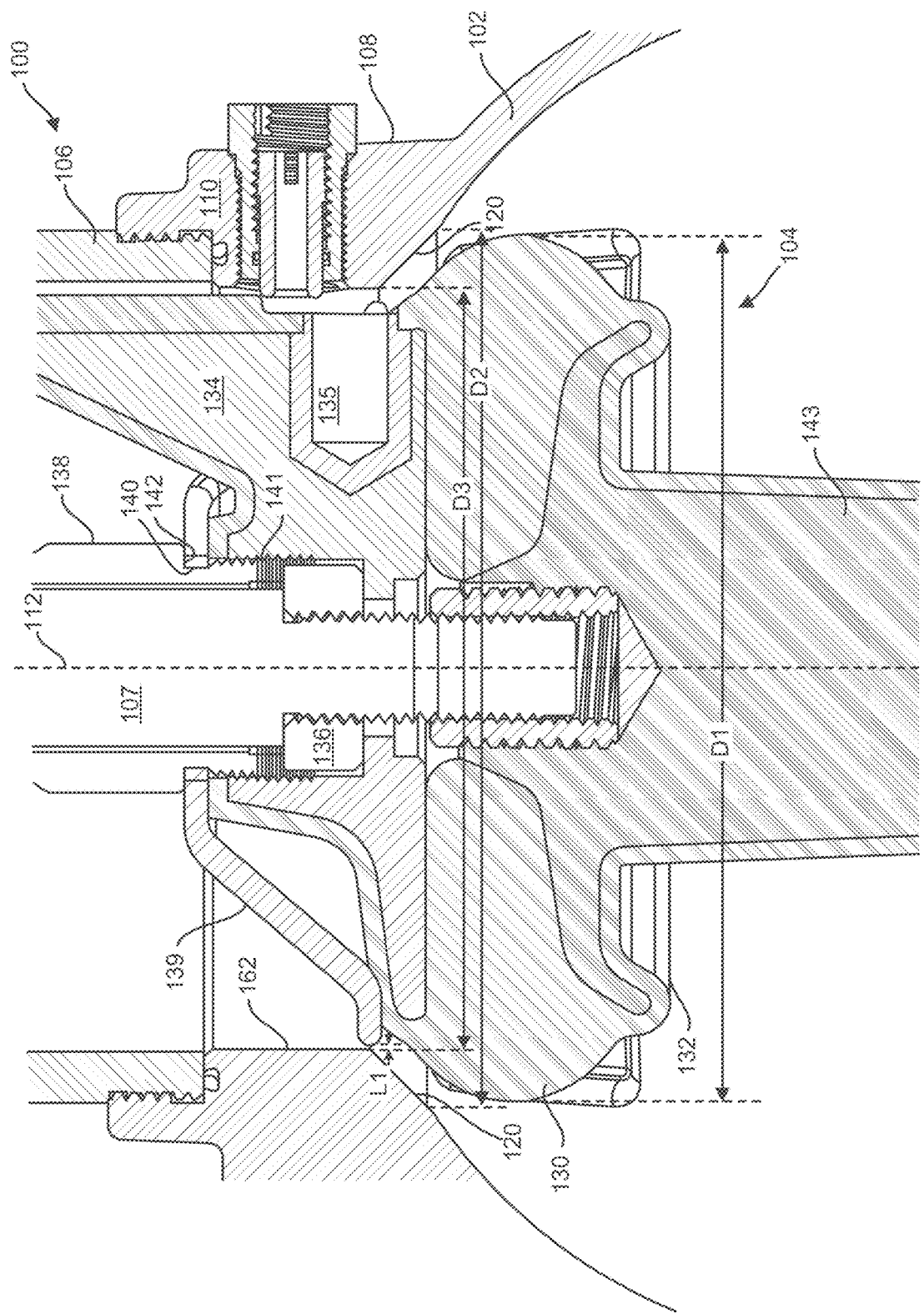
FIG. 4 shows a cross-sectional side view of a main valve assembly of a fire hydrant according to an embodiment of the invention, wherein the main valve assembly is in a partially open position.

FIG. 4 shows a cross-sectional side view of a portion of a fire hydrant 100 including an elbow 102, a main valve assembly 104, and a bottom portion of a lower barrel 106, according to an embodiment of the invention, wherein the main valve assembly 104 is in a partially open position within the elbow 102. In the open position, fluid can pass the main valve assembly 104 and flow through the elbow 102. In a closed position (not shown), the main valve assembly 104 is moved to prevent fluid from passing the main valve assembly between the elbow 102 and the main valve assembly 104. The fire hydrant 100 according to this example embodiment also includes a stem 107 extending as a shaft between the main valve assembly 104 and a cap (not shown) of the fire hydrant 100. An upper end (not shown) of the stem 107 includes an operating stem nut (not shown), which can be rotated to actuate (i.e., move axially, or raise or lower) the stem 107 and thereby open or close the main valve assembly 104.

Referring to FIG. 4, the main valve assembly 104 includes a main valve seal 130, a main valve bottom plate 132, a drain valve body 134, a thrust bearing 136, a retaining nut 138, and a baffle 139. The main valve assembly 104 can be moved between the open position, wherein fluid can pass the main valve seal 130 in route between a water main (not shown) and the lower barrel 106, and the closed position, wherein the main valve seal 130 closes the fluid path through the elbow 102.

The main valve seal 130 can be formed from an elastomeric material that can be compressed, or alternatively stretched in tension, between the main valve bottom plate 132 and the drain valve body 134. Compression, or stretching under tension of the main valve seal 130 changes an outer diameter D1 of the main valve seal 130 so that the main valve seal 130 can be inserted and removed from the elbow 102 without the need for removable valve seats or valve seat inserts.

The thrust bearing 136 can be threaded onto the stem 107, which can be inserted through the drain valve body 134 and the main valve seal 130, and threaded into the main valve bottom plate 132 until the thrust bearing 136 is received in the drain valve body 134. The main valve bottom plate 132 can be substantially formed as a disk. The retaining nut 138 can be slid over the stem 107 and threaded into the drain valve body 134 to hold the drain valve body 134 in a fixed axial position on the stem 107 while allowing the stem 107 to rotate until the retaining nut 138 is fully tightened. The retaining nut can have a gap or recess 140 between a threaded end 141 and a clamping surface or stop surface 142 into which the baffle 139 can fit adjacent the main valve seal 130, such that the retaining nut 138 can clamp or press the baffle 139 into the drain valve body 134 when the retaining nut 138 is threadingly connected into the drain valve body 134. Securing the baffle 139 in this manner secures the baffle 139 in position relative to the main valve seal 130. The connection between the drain valve body 134 and the retaining nut 138 can also be made by other now-known or future-developed means, and the threaded end 141 can be replaced accordingly.

The main valve bottom plate 132 can move axially along the stem 107 when the stem 107 is rotated, while the drain valve body 134 remains axially fixed relative to the stem 107. Accordingly, by rotating the stem 107 the thrust bearing 136 forces the drain valve body 134 and the main valve bottom plate 132 closer or farther apart, which compresses or decompress the main valve seal 130 between the main valve bottom plate 132 and the drain valve body 134, in turn altering the main valve seal's outer diameter D1. Closing the distance between the main valve bottom plate 132 and the drain valve body 134 elastically deforms the main valve seal 130, forcing the main valve seal 130 outwardly from the space between the main valve bottom plate 132 and the drain valve body 134.

The retaining nut 138 can be tightened using, for example, an "L" shaped wrench, locking the thrust bearing 136 and stem 107 into the drain valve body 134 such that the stem 107 cannot rotate and loosen the connection between the main valve bottom plate 132 and drain valve body 134 during normal operation of the main valve assembly 104.

A blade 143 can extend vertically down from the main valve bottom plate 132. The blade 143 can have a thickness approximately equal to a spacing between two plates of a guide (not shown) formed at the bottom of the elbow 102 so that the blade 143 can freely move into and out of the guide (not shown). The blade 143 engages the plates of the guide (not shown) to limit or prevent rotation of the blade 143 and the main valve bottom plate 132 relative to the elbow 102.

The elbow 102 connects the lower barrel 106 of the fire hydrant 100 to a water main (not shown). The water main and the lower barrel 106 can be oriented at different angles, typically about 90 degrees. Accordingly, a centered path through the elbow bends a corresponding amount of degrees. The elbow 102 includes a first portion 108 including a first annular wall 110 around a first center axis 112.

A main valve seat 120 provides a surface against which the main valve assembly 104 can be pressed to make a fluid seal, to seal fluid (e.g., water) from traveling between the elbow 102 and the lower barrel 106. The main valve seat 120 faces radially inward toward the first center axis 112 from the first annular wall 110. While the main valve seat 120 can face perpendicular to the first center axis 112, in the depicted embodiment, the main valve seat 120 faces obliquely toward the first center axis 112. This oblique angle can vary. The main valve seat 120 extends from a first diameter D2 to a second diameter D3 (relative to the first center axis 112), the first diameter D2 being larger than the second diameter D3. The main valve seat 120 can also define a smallest radius of the first portion 108, such that no part of the first portion 108 in the flow path toward the lower barrel 106 downstream of the main valve seat 120 constricts the fluid flow more than the main valve seat 120. In the illustrated embodiment, the second diameter D3 is the smallest radius of the first portion 108. The main valve seat 120 can be integrated with the first annular wall 110 by casting as a single piece with the elbow 102, or the main valve seat 120 can be a separate part coupled with the first annular wall 110.

Figure 5:
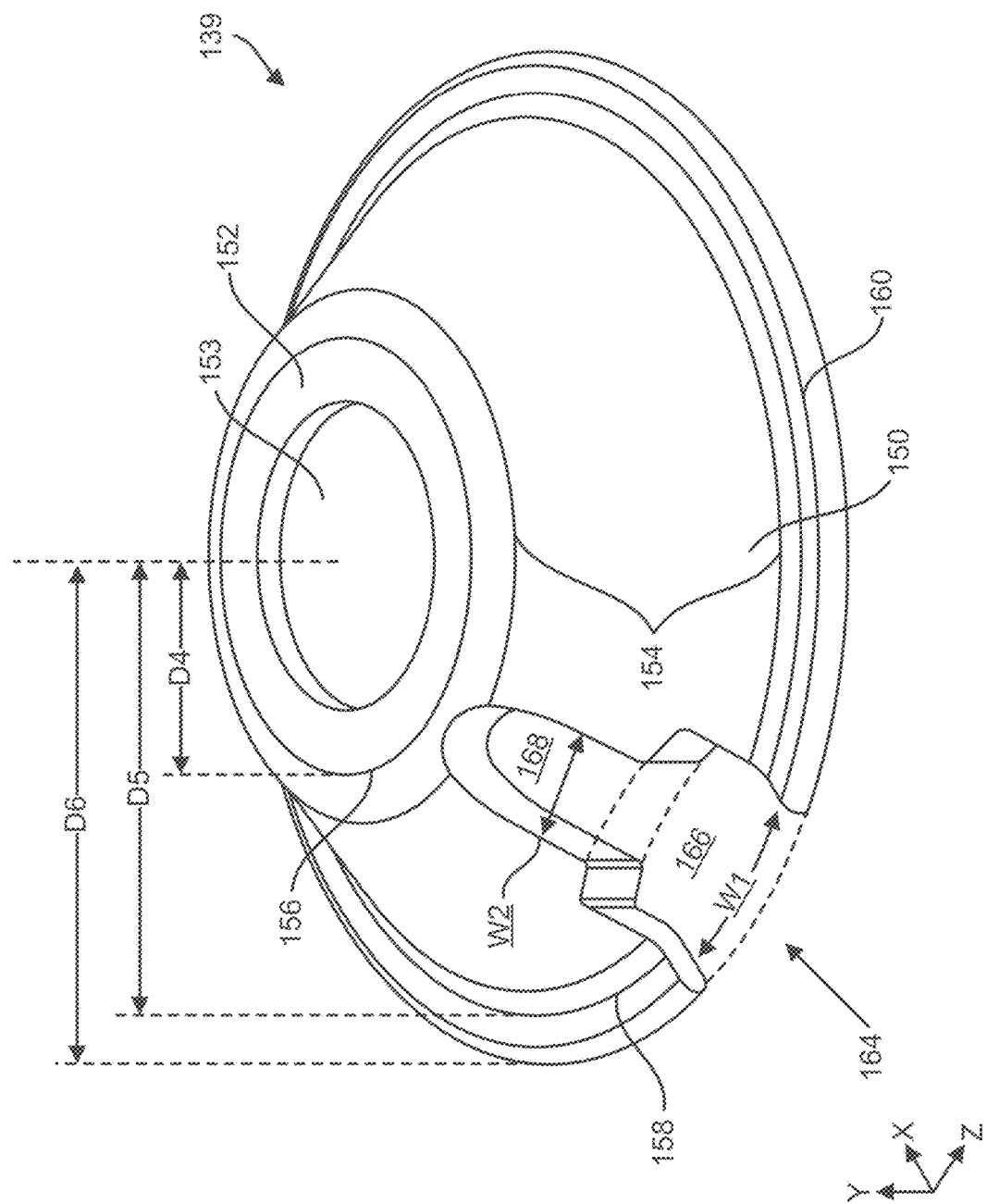
FIG. 5 shows a baffle for a main valve assembly of a fire hydrant, according to an embodiment.

FIG. 5 shows a perspective view of the baffle 139. Referring to FIGS. 4-5, the baffle 139 has an annular body 150 including a first ring portion or attachment portion 152 which can be clamped between the retaining nut 138 and the drain valve body 134. The attachment portion 152 can be flat to facilitate clamping, and can define a center hole 153 through which the stem 107 can pass.

The attachment portion 152 is connected to a hollow, cone-shaped portion 154 at a first end 156 of the cone-shaped portion 154. The first end 156 has a first outer diameter D4. The cone-shaped portion 154 also includes a second end 158 with a second outer diameter D5. The second outer diameter D5 is greater than the first outer diameter D4. This conical shaped portion 154 extends the baffle 139 from the attachment portion 152 to a second ring portion, or baffling portion, 160 adjacent the main valve seal 130.

The second ring portion 160 is connected to the cone-shaped portion 154 at the second end 158 of the cone-shaped portion 154. The second ring portion 160 extends to a third outer diameter D6, in order to provide baffling when the main valve seal 130 is within a distance of the main valve seat 120 that would result in cavitation without the baffle 139. The third outer diameter D6 of the second ring portion 160 is less than the outer diameter D1 of the main valve seal 130 and less than the second diameter D3 of the first portion 108 of the elbow 102, but the outer diameter D1 of the main valve seal 130 is greater than the second diameter D3 of the first portion 108 of the elbow 102. Accordingly, when the main valve seal 130 moves from the open position to the closed position in the elbow 102, the second ring portion 160 approaches a junction between the main valve seat 120 and an innermost surface 162 of the elbow 102 at the first portion 108. As the main valve seal 130 approaches a distance at which cavitation would begin, the second ring portion 160 approaches a distance L1 from the inner surface 162. The innermost surface 162 can define diameter D3. The second ring portion 160 approaches a junction of the main valve seat 120 and an inner surface 162 of the elbow 102 at the first portion 108, to limit and slow fluid flow sufficiently to reduce or prevent cavitation of the main valve seal 130. Above a certain velocity of fluid flowing between the main valve seat 120 and the main valve seal 130, the main valve seal 130 experiences cavitation, which increases turbulence and stress on fire hydrant components. Reducing the velocity of the fluid reduces or prevents cavitation of the main valve seal 130 and reduces or eliminates turbulence of the fluid, and reducing fluid flow between the second ring portion 160 and the main valve seat 120 or the inner surface 162 reduces fluid flow between the main valve seal 130 and the main valve seat 120. In some embodiments, the distance L1 between the second ring portion 160 and the inner surface 162 can be approximately 1.5875 millimeters (0.0625 inches). As the main valve assembly 104 closes further, until the main valve seal 130 closes fully against the main valve seat 120 (i.e., the main valve seal 130 seals against the main valve seat 120), the second ring portion 160 can move beyond the main valve seat 120 and along the inner surface 162 at the distance L1, maintaining the reduced fluid flow velocity of the fluid passing the main valve seal 130 and the second ring portion 160 to enter into the lower barrel 106.

The first ring portion 152 can be planar to facilitate being pressed between the retaining nut 138 and the drain valve body 134 at the gap 140. The first ring portion 152 can be shaped alternately, however, to facilitate retention between the retaining nut 138 and the drain valve body 134, in part dependent on the shape of the retaining nut 138 and the drain valve body 134 at the gap 140. The cone-shaped portion 154 can be angled from the first ring portion 152 to extend to a point adjacent to the main valve seal 130 within outer diameter D1 of the main valve seal 130, when the baffle 139 is installed in the main valve assembly 104. The cone-shaped portion 154 can be angled from the first ring portion 152 such that the cone-shaped portion 154 abuts and/or presses into main valve seal 130. This angle between the first ring portion 152 and the cone-shaped portion 154 can be oblique and/or obtuse.

An angle between the second ring portion 160 and the cone-shaped portion 154 can also be oblique and/or obtuse, in order to extend the second ring portion 154 to a desirable distance away from the main valve seal 130 and to a larger diameter than a diameter of the main valve seal 130 where the cone-shaped portion 154 is adjacent or in contact with the main valve seal 130. The second ring portion 160 can be parallel with the first ring portion or another angle. The second ring portion 160 can also be planar, curved, or bent to provide sufficient structural support to withstand any force of being pressed into the main valve seal 130 and any fluid pressure, while achieving the desired distance from the main valve seal 130 and the desired distance L1 from the inner surface 162.

The cone-shaped portion 154 and the second ring portion 160 together define a slot 164 configured to accommodate, or receive, the drain valve body 134 of the fire hydrant. The slot 164 has a first portion 166 that extends through the second ring portion 160. The first portion 166 can also extend into the cone-shaped portion 154. A second portion 168 of the slot 164 continues from the first portion 166 a further length through the cone-shaped portion 154. A width W1 of the first portion 166, or circumferential span over a circumferential segment of the second ring portion 160, can be different than a width W2 of the second portion 168, or circumferential span over a circumferential segment of the cone-shaped portion 154, depending on the configuration of the drain valve body 134 and a drain opening 135 of the drain valve body 134. In the illustrated embodiment, the width W1 of the first portion 166 is greater than the width W2 of the second portion 168 so the first portion 166 can accommodate the drain opening 135 in the drain valve body 134.

During closing of the main valve seal 130, rapid fluid flow through the narrowing gap between the main valve seal 130 and the main valve seat 120, according to Bernoulli's Principle, corresponds to a decrease in pressure in this gap. Without the baffle 139, the elastomeric main valve seal 130 is drawn into the gap toward the main valve seat 120 as a result of the lower pressure in the gap. Within a certain distance from the main valve seat 120, the main valve seal 130 flaps, bounces, or cavitates toward or against the main valve seat 120.

In operation of the fire hydrant 100 to close the main valve assembly 104, the operating stem nut (not shown) can be turned to raise the main valve assembly 104 within the elbow 102 toward the lower barrel 106 until the main valve seal 130 mates with the main valve seat 120. During the approach of the main valve seat 130 toward the main valve seat 120, within a gap distance range between the main valve seat 120 and the main valve seal 130 where the main valve seal 130 would experience cavitation, the outer ring portion 160 of the baffle 139 is at the distance L1, which limits the fluid flow velocity such that the pressure decrease in the gap caused by flowing fluid is lessened, and cavitation is significantly reduced or prevented.

While a specific design for a fire hydrant 100 is shown in the figures and described with respect to the figures, other fire hydrant models that use a stem and operating stem nut to operate a main valve assembly can use inventive concepts described herein.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A baffle for a main valve assembly of a fire hydrant, the baffle comprising:
    an annular body including:
        a cone-shaped portion including a first end with a first outer diameter and a second end with a second outer diameter, the second outer diameter greater than the first outer diameter, the cone-shaped portion defining a hollow;
        a first ring portion connected to the cone-shaped portion at the first end of the cone-shaped portion, the first ring portion defining a center hole continuous with the hollow; and
        a second ring portion connected to the cone-shaped portion at the second end of the cone-shaped portion, the second ring portion forming a lip extending radially outward from the cone-shaped portion.

2. The baffle of claim 1, wherein the first ring portion and the second ring portion are parallel.

3. The baffle of claim 1, wherein the first ring portion is angled obliquely to the cone-shaped portion.

4. The baffle of claim 1, wherein the second ring portion is angled obliquely to the cone-shaped portion.

5. The baffle of claim 1, wherein the second ring portion has a third outer diameter, the third outer diameter greater than the second outer diameter.

6. The baffle of claim 1, wherein the cone-shaped portion and the second ring portion together define a slot configured to receive a drain valve body of the fire hydrant.

7. The baffle of claim 6, wherein the slot has a first portion and a second portion, the first portion extending through the second ring portion, the second portion extending through the cone-shaped portion, the first portion having a first span over a first circumferential segment of the cone-shaped portion, the second portion having a second span over a second circumferential segment of the cone-shaped portion, the distance across the first span greater than the distance across the second span.

8. A main valve assembly of a fire hydrant, the main valve assembly comprising:
    a baffle including an attachment portion and a baffling portion, the baffling portion having an outer diameter;
    a main valve seal adjacent the baffle at the baffling portion, the main valve seal having an outer diameter;
    the outer diameter of the baffling portion being less than the outer diameter of the main valve seal;
    an operating stem passing through the baffle into the main valve seal; and
    an attachment element engaging the attachment portion of the baffle to secure the baffle in position with respect to the main valve seal.

9. The main valve assembly of claim 8, wherein the baffle further comprises a cone-shaped portion between the attachment portion and the baffling portion.

10. The main valve assembly of claim 8, further comprising a drain valve body, and a retaining nut, the retaining nut encircling the operating stem and threaded into the drain valve body.

11. The main valve assembly of claim 10, wherein the retaining nut includes a threaded end, a recess adjacent the threaded end to receive the attachment portion of the baffle, and a stop surface to press against the attachment portion of the baffle and secure the baffle in position relative to the main valve seal.

12. The main valve assembly of claim 8, further comprising a drain valve body, wherein the baffle includes a slot cutting through the baffling portion to receive the drain valve body.

13. The main valve assembly of claim 8, wherein the outer diameter of the baffling portion is greater than an outer diameter of an immediately adjacent portion of the main valve seal.

14. A fire hydrant comprising:
    an elbow including an inner circumference and a main valve seat around the inner circumference, the main valve seat having an inner circumference and an innermost diameter; and
    a main valve assembly in the elbow, the main valve assembly including a main valve seal and a baffle adjacent the main valve seal,
    the main valve seal configured to abut and seal against the inner circumference of the main valve seat,
    the baffle having an outermost diameter, the outermost diameter of the baffle being less than the innermost diameter of the main valve seat.

15. The fire hydrant of claim 14, wherein the main valve seat protrudes radially inward from the inner circumference of the elbow toward a first center axis of the elbow.

16. A main valve assembly of a fire hydrant, the main valve assembly comprising:
    a baffle including an attachment portion and a baffling portion;
    a main valve seal adjacent the baffle at the baffling portion;
    an operating stem passing through the baffle into the main valve seal;
    an attachment element engaging the attachment portion of the baffle to secure the baffle in position with respect to the main valve seal; and
    a drain valve body, the attachment element including a retaining nut encircling the operating stem and being threaded into the drain valve body.

17. The main valve assembly of claim 16, wherein the retaining nut includes a threaded end, a recess adjacent the threaded end to receive the attachment portion of the baffle, and a stop surface to press against the attachment portion of the baffle and secure the baffle in position relative to the main valve seal.

18. A main valve assembly of a fire hydrant, the main valve assembly comprising:
    a baffle including an attachment portion and a baffling portion;
    a main valve seal adjacent the baffle at the baffling portion;
    an operating stem passing through the baffle into the main valve seal;
    an attachment element engaging the attachment portion of the baffle to secure the baffle in position with respect to the main valve seal; and
    a drain valve body, the baffle including a slot cutting through the baffling portion to receive the drain valve body.

* * * * *